US006247611B1

(12) United States Patent
Clements et al.

(10) Patent No.: US 6,247,611 B1
(45) Date of Patent: Jun. 19, 2001

(54) FLAT PACKET VENDING MACHINE WITH REMOVABLE CARTRIDGE

(75) Inventors: Matthew J Clements, Bethel Park, PA (US); Eric Hofmeister; Robert C. Johnson, both of Solon, OH (US)

(73) Assignee: Mathew Clements, Bethel Park, PA (US)

( * ) Notice: Subject to any disclaimer, the term of this patent is extended or adjusted under 35 U.S.C. 154(b) by 0 days.

(21) Appl. No.: 09/419,195

(22) Filed: Oct. 15, 1999

(51) Int. Cl.[7] ............................ B65G 59/00; B65H 3/00; G07F 11/24

(52) U.S. Cl. ......................... 221/277; 221/154; 221/181; 221/251

(58) Field of Search .................................... 221/154, 187, 221/215, 222, 231, 242, 251, 261, 273, 274, 277

(56) References Cited

U.S. PATENT DOCUMENTS

| | | | | |
|---|---|---|---|---|
| 3,680,736 | * | 8/1972 | Viessmann | 221/231 X |
| 4,382,526 | | 5/1983 | Stone . | |
| 4,586,633 | | 5/1986 | Holland et al. . | |
| 4,589,571 | | 5/1986 | Sykes . | |
| 4,700,869 | | 10/1987 | Bogner . | |
| 4,767,022 | | 8/1988 | Oldorf . | |
| 5,190,185 | * | 3/1993 | Blechl | 221/154 X |
| 5,265,759 | | 11/1993 | Coffin . | |
| 5,295,592 | | 3/1994 | Thorne . | |
| 5,407,094 | | 4/1995 | Vajtay . | |
| 5,447,253 | | 9/1995 | Williams . | |
| 5,476,190 | * | 12/1995 | Hermann et al. | 221/274 X |
| 5,590,813 | | 1/1997 | Abramczyk . | |
| 5,607,085 | | 3/1997 | Cooper . | |
| 5,642,837 | | 7/1997 | Hayes et al. . | |
| 5,836,661 | | 11/1998 | Oldorf . | |
| 5,857,588 | * | 1/1999 | Viessmann | 221/274 X |

* cited by examiner

*Primary Examiner*—Christopher P. Ellis
*Assistant Examiner*—Gene O. Crawford
(74) *Attorney, Agent, or Firm*—Law Offices of K. Patrick McKay

(57) ABSTRACT

A vending apparatus for containing and releasing generally box-shaped or flat articles is disclosed. The articles are vertically stacked in a pre-packaged cartridge that removably mounts on top of a fixed housing. The main housing collects coins to account for purchases of each product independently, which is released by a rotating cam after the turning of a knob. A securable door allows limited access to the coin collecting box.

10 Claims, 8 Drawing Sheets

FLAT PACKET VENDING MACHINE WITH REMOVABLE CARTRIDGE

BACKGROUND

1. Field of the Invention

The present invention relates to vending machines and dispensers for containing and releasing articles. In particular, a vending apparatus adapted to collect coins is disclosed for dispensing packets, generally flat or box-like such as towelettes and non-prescription medication, by including a wall mountable or free-standing fixture for receiving pre-packaged cartridges. The vending apparatus receives coins to allow passage of stacked packages from a rectangular cartridge into a secured chamber. The cartridge is mounted above the coin mechanism for simple retrieval and replacement. The cartridge contains pre-packaged items for dispensing, and the cartridge is easily changed out and, where allowed, becomes recyclable.

2. Description of the Related Art

Multi-product, coin-operated vending machines can normally be found in shopping malls or grocery stores. The machines vend a variety of products, from small candies or gumballs to large toys and packages. These machines are normally compartmented to receive the items directly into the device, which may be transparent to allow identification of the need to refill. Refilling these devices is normally done by the respective company of the articles and may be unsanitary, costly, or even result in spillage onto a public venue. The actual mechanics used for the coin and release mechanism may be very bulky and costly. This traditional means of vending uses a middle-man to stock and re-stock the machine, which increases the cost to the user, and decreases the margin of profit to the vending site.

More simple devices that are not coin-operated are also known to dispense packaged articles. As seen in U.S. Patents such as those by Stone and Abramczyk, simple containers can dispense small articles from a stacked position simply by having a lip at a bottom surface whereon the articles fall by gravity. The items that are distributed in this simple manner may be subject to size constraints depending on the articles contained therein. The design of these simple containers subjects them to vandalism.

The purpose of storing and dispensing articles such as non-prescription medication packets, as seen in U.S. Pat. No. 4,767,022, by Oldorf, is to allow purchasers at stores to have the convenience of the low cost packets easily at their disposal. Distributing small articles in this manner, can, however, cause for loss of profit due to inventory loss or theft. Many lack a simple design for a coin receiving mechanism, yielding an undue burden for a store clerk in accounting for purchases.

Thus, there is a need for a packer-vending device that can collect coins and is secured from theft, which allows for the dispensing of pre-packaged articles in already assembled cartridges. The device employs a means for removably sliding the compartments holding the flat articles, such that the coin mechanism is fixated while the articles can be replaced in a quick and simple manner. In this way, earnings for sales are already accomplished by the coin feed, and the articles are more efficiently replenished.

SUMMARY OF THE INVENTION

It is the objective of the present invention to provide a coin-collecting vending machine that utilizes a disposable cartridge adapted to hold a number of pre-loaded packets. The cartridges may be purchased in bulk by a store owner, and the individual packets are purchased individually by a customer by the insertion of a coin and operation of the coin mechanism.

It is a further objective of the present invention to coordinate the number of product packets in the cartridge with the amount of coins collected in a coin box, thereby yielding a known amount of income for the store clerk. In one embodiment, the coins can be automatically stacked for packaging in bank-acceptable rolls.

It is a further objective of the present invention to provide variability of shape within the cartridge to allow for the containment of groups of packets with varying dimensions and geometries. Notched grooves in the cavity of the cartridge allows sleeves to be slid therein, thereby reducing the area of the cavity such that packets of smaller dimension are easily stored and individually released by the same release mechanism.

It is a further objective of the present invention to provide the cartridge slidably attached to a fixed main housing. The main housing has a locking door to allow for secure access to the coin box, and thereby be fixed to a variety of surfaces in an easily accessible area of a convenient store or gas station. This reduces loss of credit from theft.

It is a further objective of the present invention to include a simple design for the product release mechanism adapted to individually force packets from the cartridge to exit upon deposition of the coin. The packets are released and slide down an inclined chute for easy retrieval by the customer. The simplicity of the design is appropriate for the low cost of purchasing products residing in flat packets or boxed articles, such as towelettes or individually packaged non-prescription medication.

DETAILED DESCRIPTION OF THE PREFERRED EMBODIMENT

The invention will now be described in detail in relation to a preferred embodiment and implementation thereof which is exemplary in nature and descriptively specific as disclosed. As is customary, it will be understood that no limitation of the scope of the invention is thereby intended, and that the invention encompasses such alterations and further modifications in the illustrated device, and such further applications of the principles of the invention illustrated herein, as would normally occur to persons skilled in the art to which the invention relates.

Figure 1:
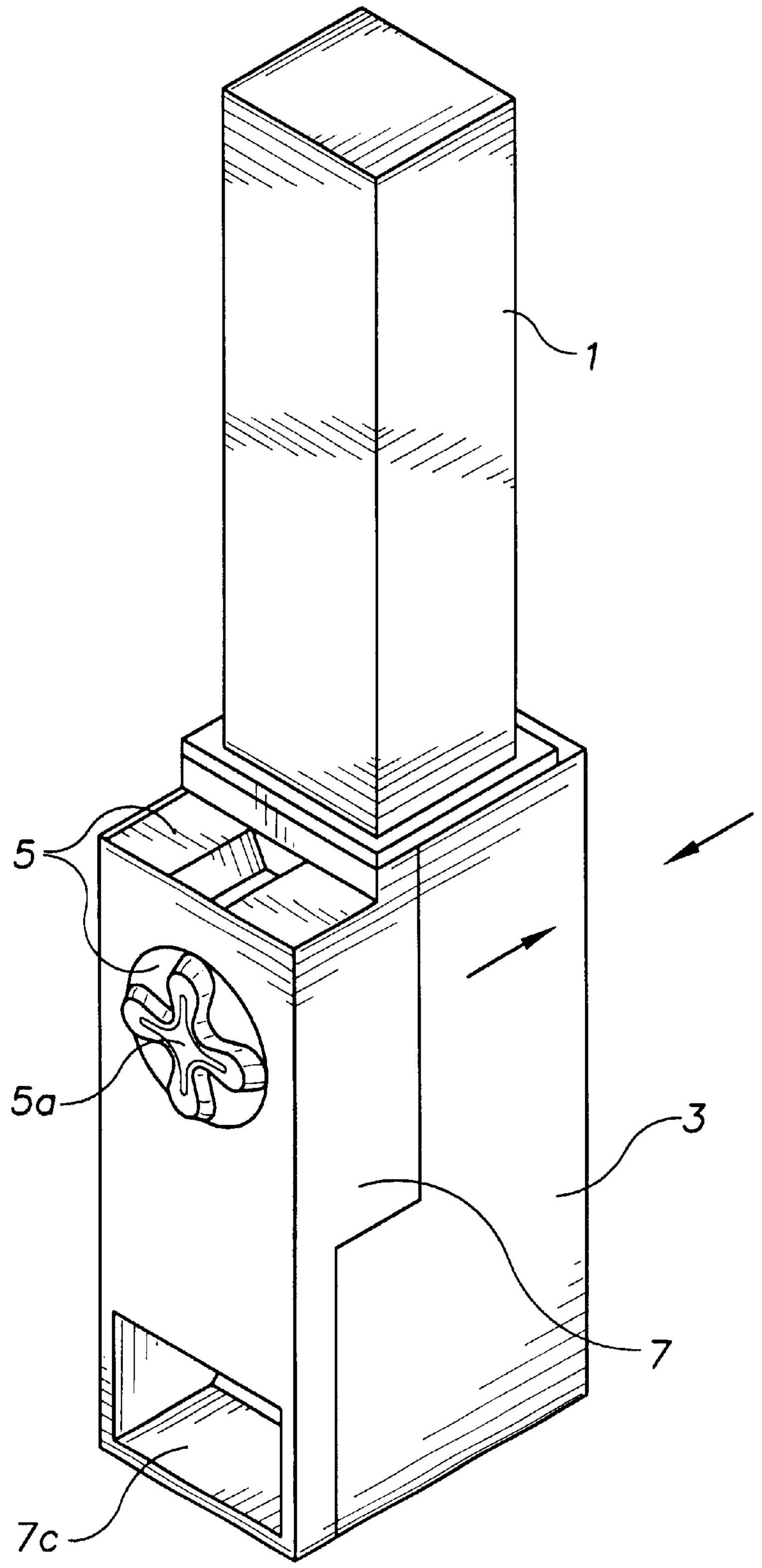
FIG. 1 is a perspective view of the vending apparatus intact and showing the main exterior components of the system.

The present invention comprises four main subassemblies. With reference to FIG. 1, a substantially rectangular product cartridge 1 slides into a removable position disposed above a main housing 3. The main housing 3 has an exterior and an interior and is configured to mount against a wall, counter, post, etc. with any type of attachment means. The main housing 3 may also rest on top of a countertop or floor stand if required. Hingedly attached to main housing 3 is a door 7, which is securely closed and locked against the main housing 3, thereby securing the product cartridge 1. The door 7 can be unlocked and opened to allow access to the interior of the main housing 3. Disposed with the door 7 is a release mechanism 5, which, upon actuation by the turning of the knob 5*a*, releases and pushed the product out from the product cartridge 1 for retrieval by a customer by way of the door opening 7*c* for access to the product, as further described.

Figure 2:
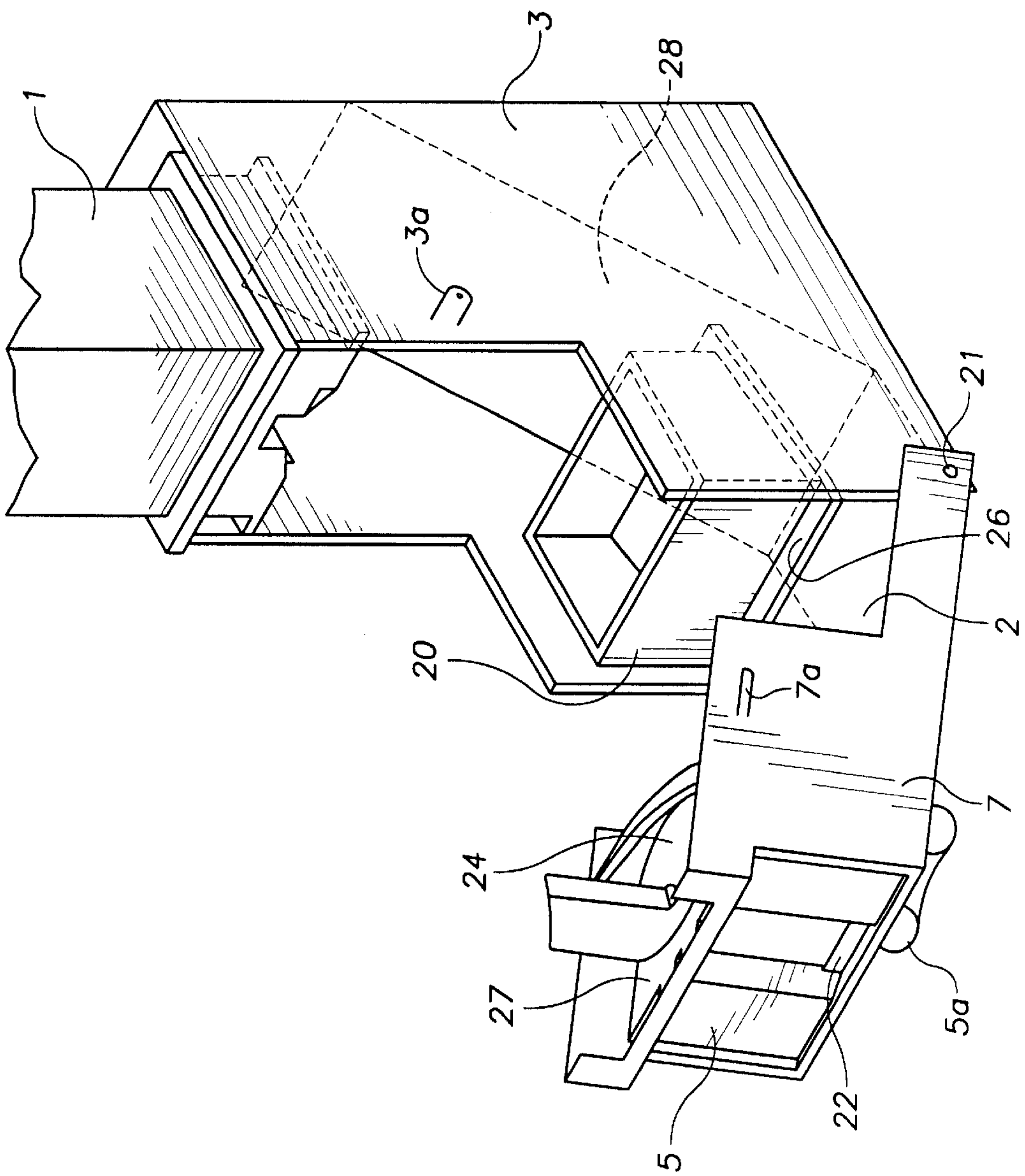
FIG. 2 is a perspective view of the vending apparatus showing the door open to reveal the inner components of the system.

FIG. 2 shows, in more detail, the features of the four main components with the door 7 opened and connected to the main housing 3 by a hinge 21 to reveal the interior of the main housing 3. The main housing 3 comprises an interior and a generally L-shaped exterior. A means for locking the door 7 to the main housing 3, in this embodiment, is shown as the main housing 3 having a housing locking latch 3*a* fixedly attached to the exterior, which can receive a padlock there through and connect through a door lock latch 7*a* disposed on an outer surface of the door 7, whereby the door is fixedly closed to the main housing 3. Other locking means may be employed such as a key lock or a combination lock much like a safe.

A coin box 20 rests on a coin box shelf 26 in the interior of the main housing 3. The coin box shelf 26 is horizontally disposed above a product exitway 2, which is slightly inclined towards the back of the main housing 3. The product exitway 2 is formed integral with a more steeply inclined product pathway 28, which runs up to the top of the back of the main housing 3 behind the product cartridge 1. The product will fall out of the product cartridge 1 and slide down the product pathway 28 to the product exitway 2 upon actuation of the release mechanism 5.

The release mechanism 5 is disposed within the door 7 and comprises a turning knob 5*a* on a front face and a rotating cam 24 disposed against a back face 27. A coin entrance 22 in disposed above the release mechanism 5 wherein a coin is placed before actuation of the relapse mechanism 5.

Figure 3:
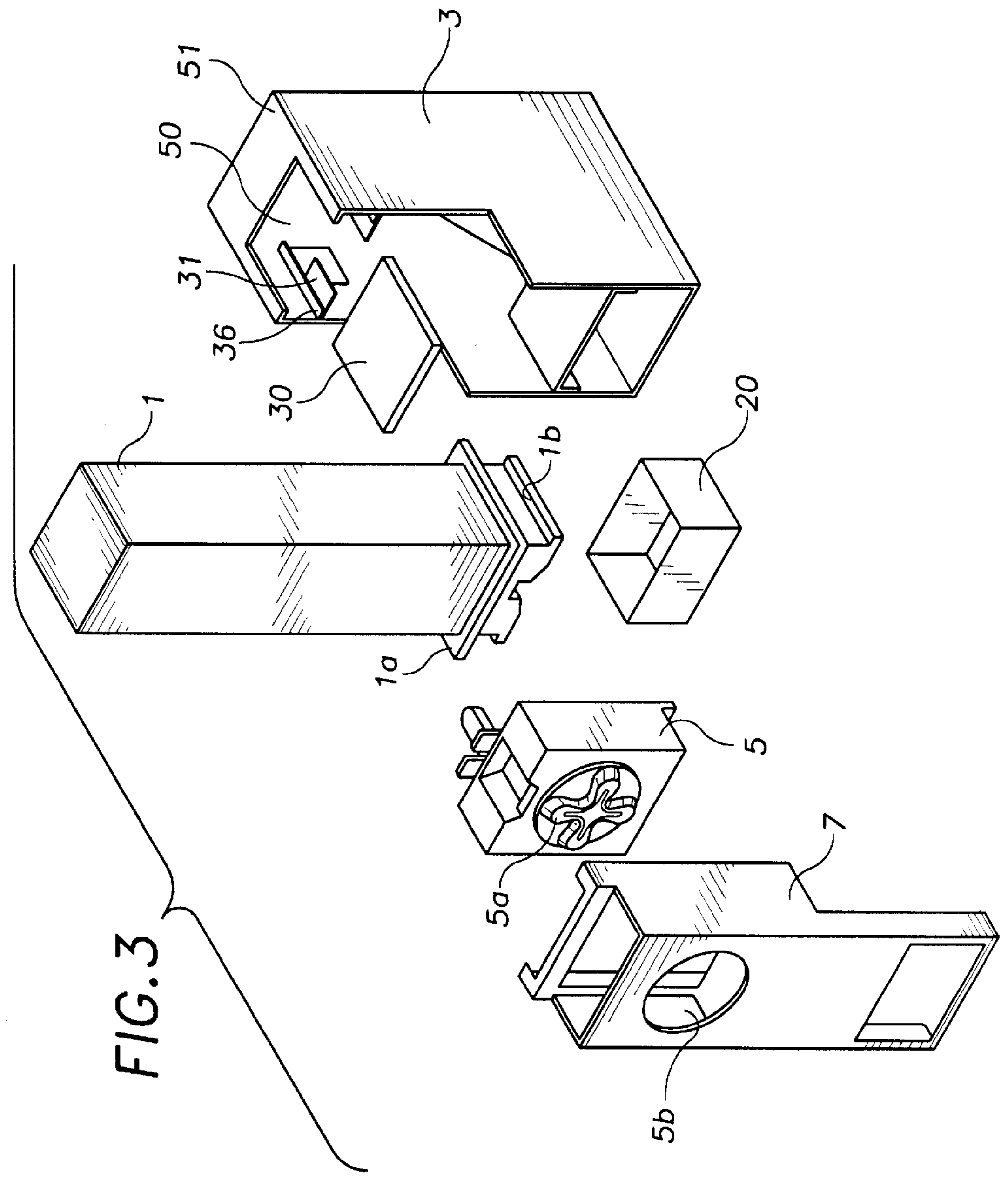
FIG. 3 is an exploded view of the vending apparatus showing the main components and the details of assemblage of the system.
Figure 8:
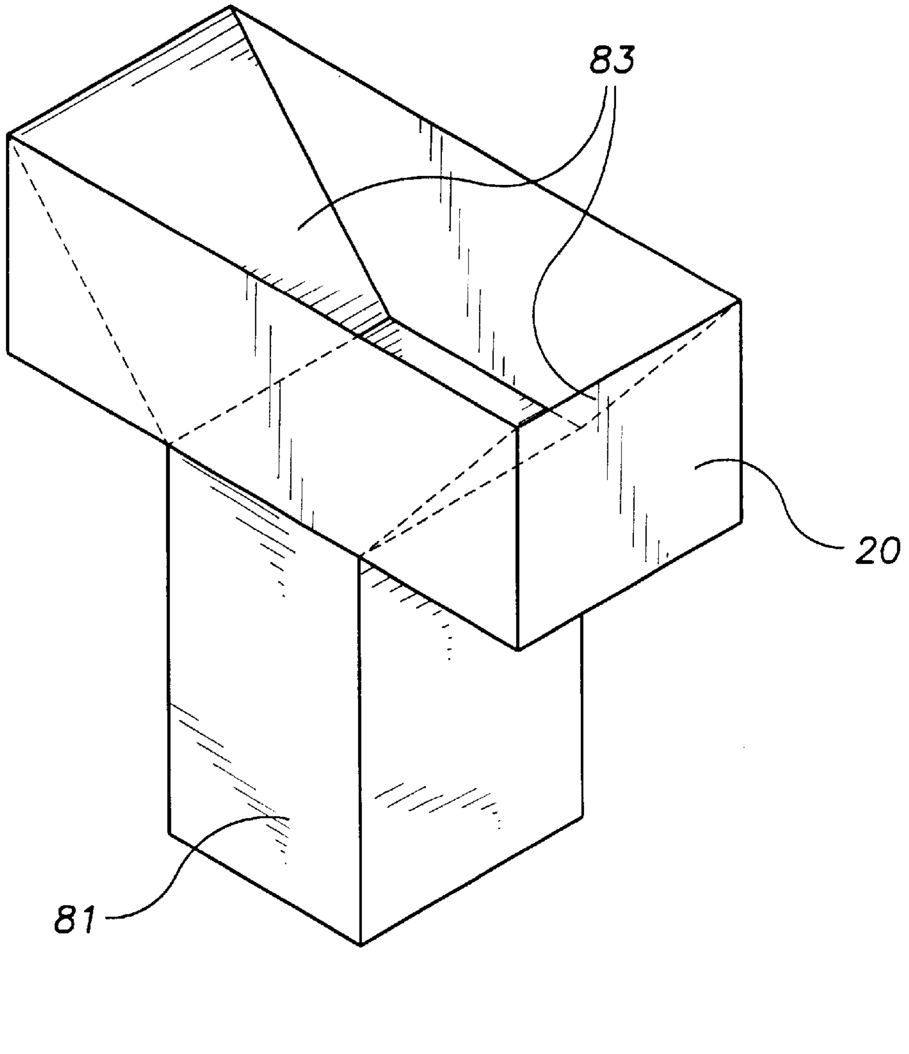
FIG. 8 is a perspectivbe view of an alternative embodiment of the coined box.

In relation to FIG. 3, the main components is a disassembled array show how the release mechanism 5 has a turning knob 5*a*, which would be placed through a circular knob hole 5*b* in the front surface of the door 7. In this embodiment, the coin box 20, is shaped similar to a rectangular box. In another embodiment, the coin box 20, may alternatively be shaped as having a trunconical inner surface leading down to a vertical stacking column, or the inner surface may be declined to lead down to this vertical stacking column. This embodiment is shown in FIG. 8.

The bottom of the product cartridge 1 has an upper flange 1*a* disposed around the perimeter of the product cartridge 1, and a lower flange 1*b* situated below the upper flange 1*a*. The upper flange 1*a* is adapted to sit on the top 51 of the main housing 3. The lower flange 1*b* slides in between a horizontal receiving ledge 31 and a horizontal guide 31*a*, both of which oppose one another to define a space substantially large enough to allow the lower flange 1*b* to slide through proximate to the top 51 of the interior of the main housing 3. The receiving ledge 31 is shorter in length relative to the guide 31. The receiving ledge 31, however, is wider than the guide 31*a*, producing a width substantially wide enough and perpendicular to an inner wall 50 of the interior of the main housing 3 to seat opposing edges of the product 30 thereon, whereby the cartridge 1 holding the product 30 in a vertical stack is slidably mounted at the top 51 of the main housing 3.

Figure 4:
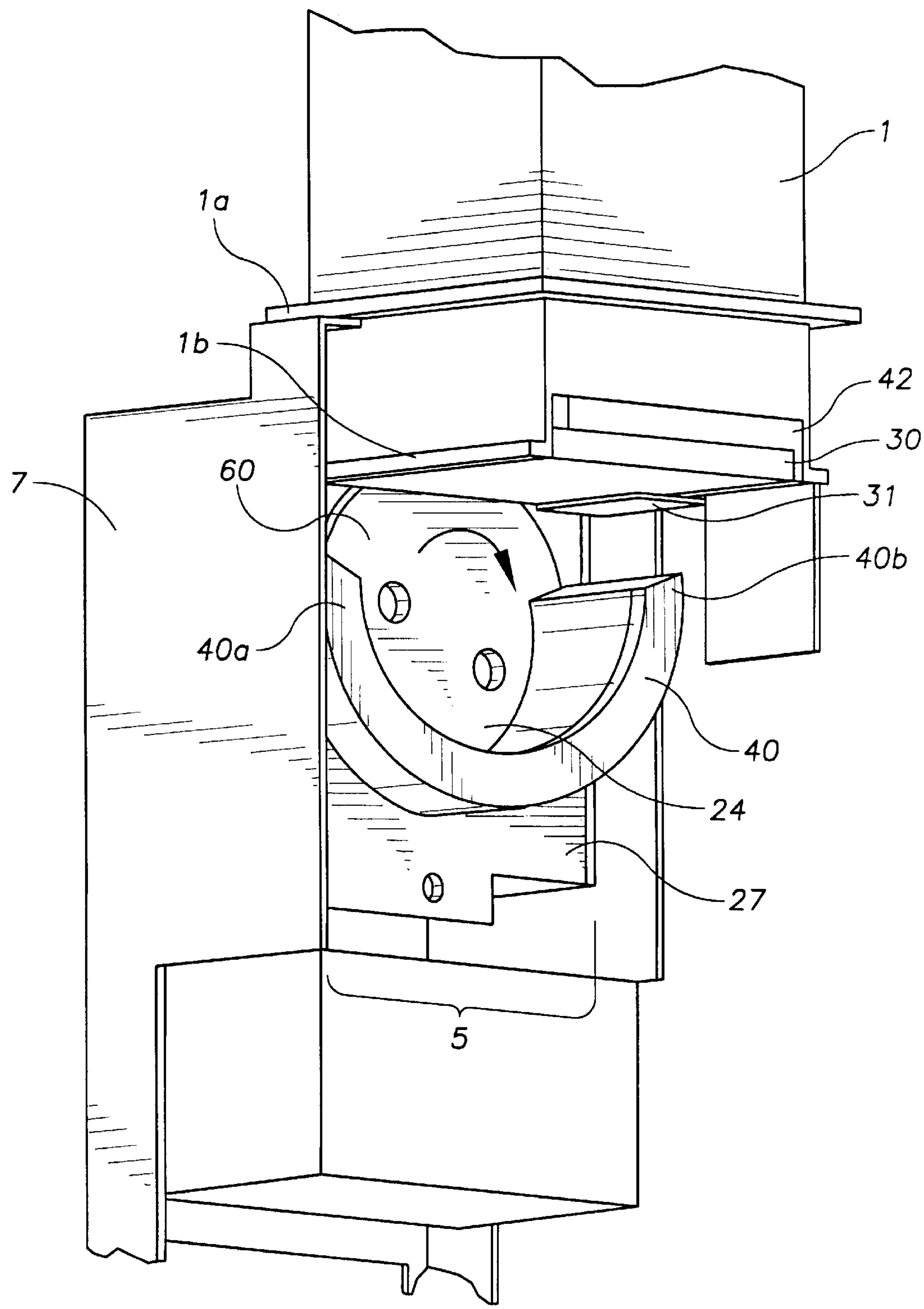
FIG. 4 is a detailed rear view of the rotating cam disposed at the back face of the release mechanism.

FIG. 4 shows the structural features of the release mechanism 5, which allows the release of the product 30. A circular, rotatable cam 24 is disposed against the back face 27*a* of the release mechanism 5. A cam lip 40 having a cam lip bottom 40*a* and an opposing cam lip top 40*b* is formed integral with and perpendicular to an outer edge 60 of the cam 24. The cam lip 40 travels along the outer edge 60 of the cam 24 and inclines obliquely to its cam lip top 40*b*, whereby the cam lip top 40*b* is of greater height than the cam lip bottom 40*a*.

Before operation of the cam 24, the product 30 is seated at the bottom of the cartridge 1 and resting on the receiving ledge 31. The upper flange 1*a* of the cartridge 1 keeps the cartridge 1 steadily disposed above the door 7 and the main housing 3 (FIG. 3). In this figure, the product 30 has not been pushed out of the cartridge exit 42 near the bottom of the cartridge 1 because the cam lip 40 has not contacted the product 30. Thus, it is critical that the cartridge be sized to hold product 30 in a manner where the product 1 is situated proximate to the outer rim 60 of the cam 24.

In operation, a user deposits a coin into coin entrance 22 (FIG. 2), which allows the cam 24 to be turned. In the preferred embodiment the turning know 5*a* is only operable by the insertion of a coin, which falls into the coin box 20 upon rotation of the cam 24, as known in the art. However, the turning knob 5*a* may turn freely if the coin entrance 22 simply allows the coins to fall directly into the coin box 20 because of its vertical alignment. In this embodiment, the release mechanism 5 is operable without a coin, but the coins are still stored in the coin box 20 for collection. Thus, product inventory is still accounted for within the vending apparatus if a store clerk wishes to account for the purchases separately from a customer.

Figure 5:
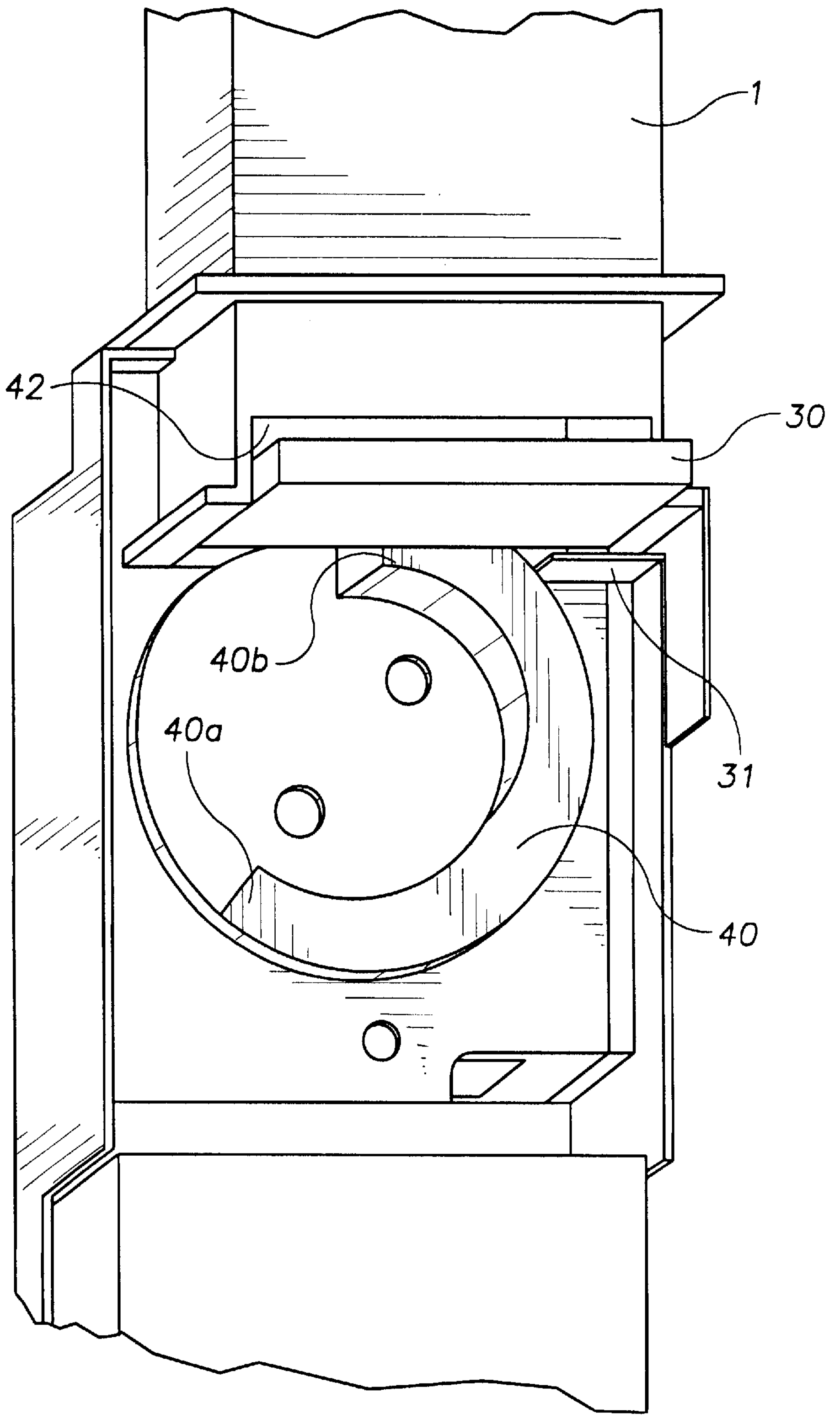
FIG. 5 is a detailed rear view of the rotating cam at three-quarters turn, whereby the product is about to fall out of the cartridge.

The user turns the cam 24 by means of the turning knob (FIG. 5*a*), and, upon rotation of the cam 24, (see FIG. 5) the cam lip bottom 40*a* comes into contact with the product 30. As the cam 24 is further turned, the height of the cam lip 40 at a point near the product increases due to its inclination towards the cam lip top 40*b*. The cam lip 40 then gradually pushes the product 30 off of the receiving ledge 31 as the product yields to a force of the heightened cam lip 40, whereby the product 30 falls through the cartridge exit 42 and down to the product exitway 2 (FIG. 2) for retrieval by the user.

Figure 6:
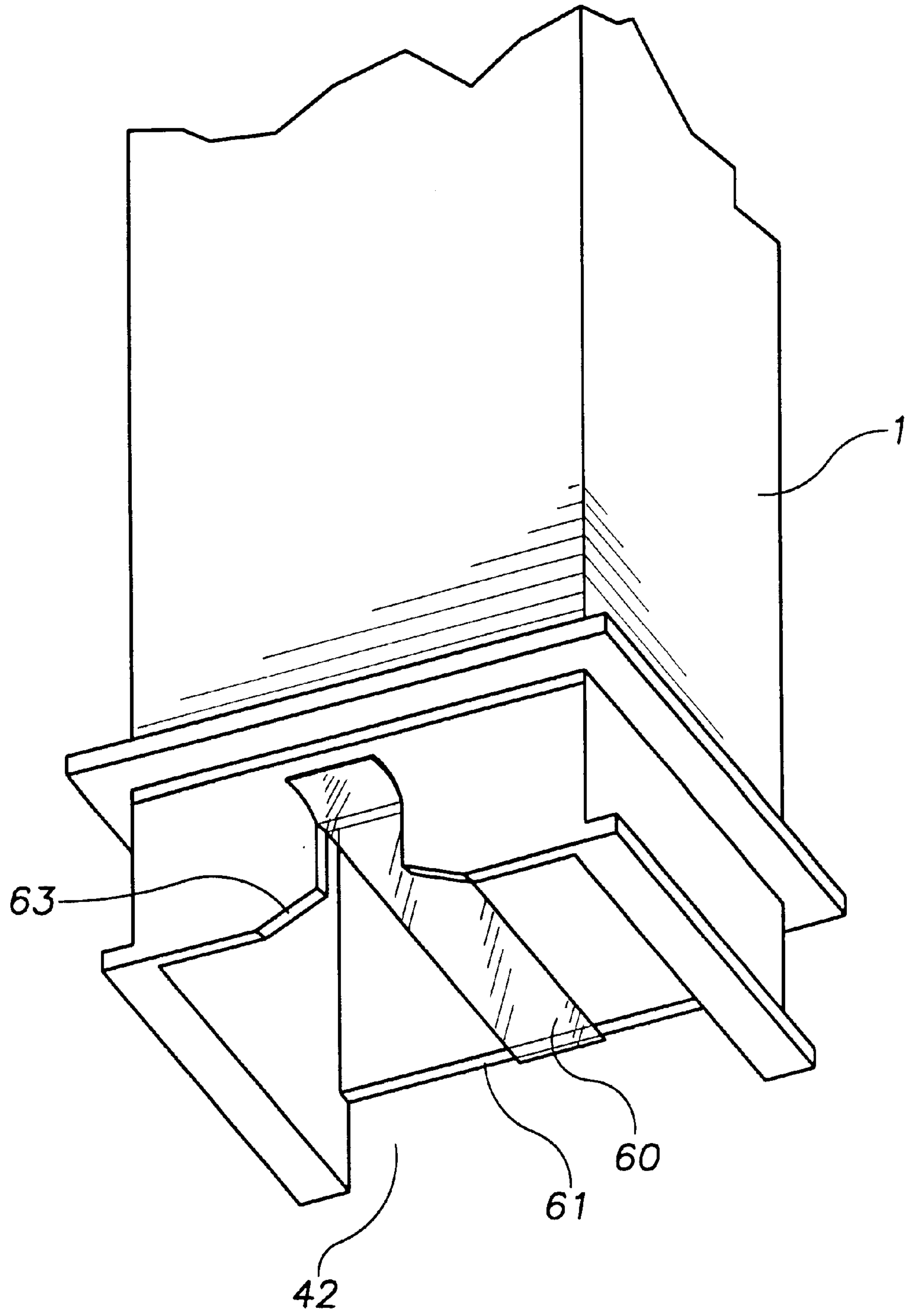
FIG. 6 is a bottom front view of the cartridge showing the flexible band that holds the product within the cartridge before actuation of the release mechanism.

FIG. 6 is a bottom front view of the product cartridge 1. The product, preferably generally flat and rectangular, much like small box-shaped articles or flat packets of non-prescription medication or moist towelettes, is stored in a vertically stacked column and held within the cartridge by a horizontal holding strip 60. Other product securing means may be used such as microcoating or lids. Before use of the product cartridge 1 within the vending apparatus, the holding strip 60 or other product securing means is removed. The holding strip 60 can be made of an adhesive tape or a flexible plastic material removably attached to an upper rim 61 of an opening that defines the cartridge exit 42.

This view also shows a concavical indent 63 centrally and frontally located at the bottom of the product cartridge 1, which defines a space in front of which a bottommost product is displaced after removal of the holding strip 60 and where the cam lip 40 rotates through to push the product through the cartridge exit 42.

Figure 7:
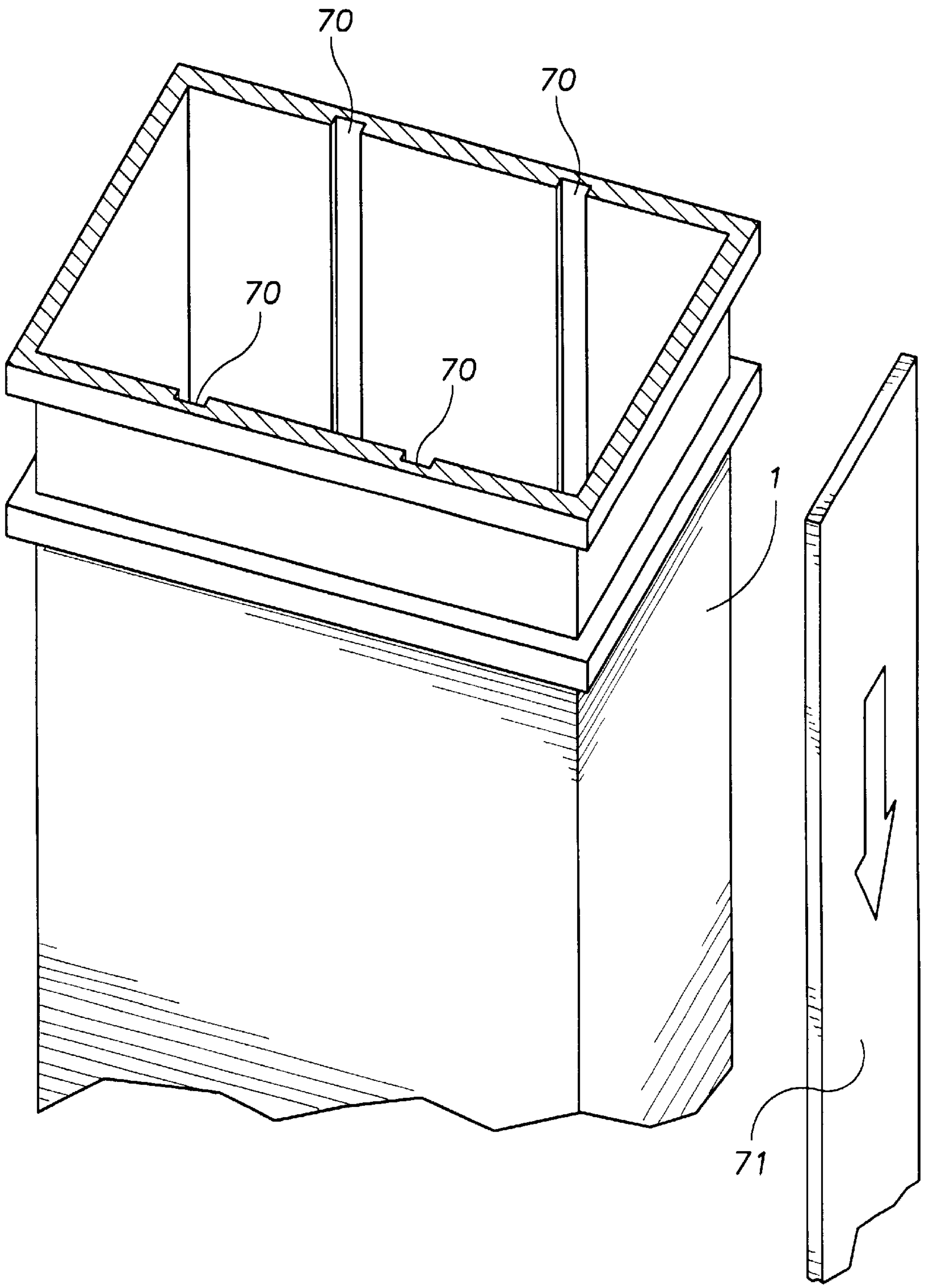
FIG. 7 is a perspective of the top of the cartridge showing the notched grooves wherein sleeves are slid in to vary the dimension of the inner cavity of the cartridge.

FIG. 7 shows an alternative embodiment of the product cartridge 1 having at lease four notched grooves 70 vertically disposed within opposing inner surfaces of the product cartridge 1. At lease two rectangular sleeves 71 can then slide into the notched grooves 70, thereby reducing the area within the product cartridge 1 such that products of smaller dimension can be vertically stacked and utilized with the vending apparatus.

FIG. 8 shows an embodiment of a coin box 20 having a t-shaped exterior 81 and an interior defined by opposing declined planes 83 to allow coins to be stacked vertically upon deposition into the vending apparatus.

We claim:

1. A coin-collecting vending apparatus, comprising:

- a substantially rectangular product cartridge adapted to hold a plurality of products in a vertical stack, further comprising:
  - an indent centrally and frontally located at a bottom of said product cartridge;
  - a removable product securing means covering said bottom;
  - an upper flange disposed around a perimeter of said product cartridge proximate to said cartridge bottom;
  - a lower flange situated below said upper flange;
  - a cartridge exit defined by an opening in a back at said bottom of said product cartridge;
- a main housing, further comprising:
  - an interior and an exterior;
  - a product exitway disposed within said interior proximate to a font of said exterior;
  - a product pathway inclining towards a top of said interior;
  - a coin box shelf horizontally disposed above said product exitway adapted to receive a coin box thereon;
  - a horizontal guide disposed within said interior and attached perpendicularly to an inner wall proximate to said top;
  - a horizontal receiving ledge situated just below said horizontal guide being generally wider than said horizontal guide, whereby said horizontal guide and said horizontal receiving ledge define a space substantially large enough to allow said lower flange of said product cartridge to slide through, thereby said product cartridge is removably situated on said top supported by said upper flange with a bottommost one of said products situated on said horizontal receiving ledge upon removal of said product securing means;
  - a door hingedly attached to said main housing adapted to be secured to said main housing by a locking means;
  - a release mechanism disposed within said door adapted to release each of said products out of said product cartridge; and,
  - a coin entrance disposed above said release mechanism and vertically aligned with said coin box for receiving a coin.

2. The coin-collecting vending apparatus of claim 1, wherein at lease four notched grooves are vertically disposed within opposing inner surfaces of said product cartridge and are configured to receive at least two rectangular sleeves, thereby reducing an area within said product cartridge.

3. The coin-collecting vending apparatus of claim 1, wherein said removable product securing means is a horizontal strip made of a flexible plastic material.

4. The coin-collecting vending apparatus of claim 1, wherein said removable product securing means comprises a horizontal strip made of an adhesive tape.

5. The coin-collecting vending apparatus of claim 1, wherein said product cartridge is disposable.

6. The coin-collecting vending apparatus of claim 1, wherein said product cartridge is recyclable.

7. A coin-collecting vending apparatus, comprising:

- a product cartridge adapted to hold a plurality of products in a vertical stack, further comprising:
  - an indent centrally and frontally located at a bottom of said product cartridge;
  - a removable product securing means covering said bottom;
  - an upper flange disposed around a perimeter of said product cartridge proximate to said cartridge bottom;
  - a lower flange situated below said upper flange; and,
  - a cartridge exit defined by an opening in a back at said bottom of said product cartridge;
- a main housing further comprising:
  - an interior having a back and a front;
  - an exterior having a top, a base, and an exterior back;
  - a product exitway disposed within said interior at said front inclining slightly from said front and terminating at said back of said interior;
  - a steeply inclined product pathway formed integral with said product exitway running up to said back proximate to said top;
  - a coin box shelf horizontally disposed above said product exitway adapted to receive a coin box thereon;
  - a horizontal guide disposed within said interior and attached perpendicularly to an inner wall proximate to said top; and, a horizontal receiving ledge situated just below said horizontal guide being generally wider than said horizontal guide for receiving said product cartridge;

a door hingedly attached to said main housing adapted to be secured to said main housing by said locking means, said door, further comprising:

a door opening for access into said product exitway;

a locking means for securing said door to said main housing; and, a knob hold defined by a circular hole in a front surface of said door;

a release mechanism disposed within said door having a front face and a back face, and further comprising:

a turning knob on said front face configured to protrude from said knob hole;

a circular, rotatable cam disposed against said back face configured to be situated proximate to said indent and said bottommost product upon securing of said door to said main housing by said locking means;

a cam lip having a cam lip bottom and an opposing cam lip top, said cam lip formed integral with and perpendicular to an outer edge of said cam and travels along said outer edge inclining obliquely to said cam lip top, whereby said cam lip is of greater height than said cam lip bottom, thereby said cam lip is permitted to come into contact with said bottommost product upon rotation, and thereby said bottommost product is pushed through said cartridge exit and travels down to said product exitway for retrieval; and, a coin entrance disposed above said release mechanism and vertically aligned with said coin box for receiving a coin.

8. The coin-collecting vending apparatus of claim 7, wherein said coin box is a rectangular box.

9. The coin-collecting vending apparatus of claim 7, wherein said coin box has a t-shaped exterior and an interior defined by opposing declined planes to allow said coins to be stacked vertically upon falling into said coin box.

10. The coin-collecting vending apparatus of claim 7, wherein a means for mounting said main housing is attached to said exterior back of said main housing.

* * * * *